United States Patent
Hoberman et al.

(10) Patent No.: US 7,788,638 B2
(45) Date of Patent: Aug. 31, 2010

(54) METHOD AND SYSTEM FOR DATA FILE PROCESSING

(75) Inventors: Gary A. Hoberman, Merrick, NY (US); Lestan D'Souza, New York, NY (US)

(73) Assignee: Citigroup Global Markets Inc., New York, NY (US)

( * ) Notice: Subject to any disclaimer, the term of this patent is extended or adjusted under 35 U.S.C. 154(b) by 1440 days.

(21) Appl. No.: 10/718,885

(22) Filed: Nov. 21, 2003

(65) Prior Publication Data

US 2005/0114287 A1    May 26, 2005

(51) Int. Cl.
    *G06F 9/45* (2006.01)
(52) U.S. Cl. .................................... 717/120
(58) Field of Classification Search ............. 717/120
    See application file for complete search history.

(56) References Cited

U.S. PATENT DOCUMENTS

| | | | | |
|---|---|---|---|---|
| 6,041,363 A | * | 3/2000 | Schaffer | 719/321 |
| 6,067,639 A | * | 5/2000 | Rodrigues et al. | 714/38 |
| 6,249,821 B1 | * | 6/2001 | Agatone et al. | 719/316 |
| 6,601,233 B1 | * | 7/2003 | Underwood | 717/102 |
| 6,725,427 B2 | * | 4/2004 | Freeman et al. | 715/526 |
| 2004/0143477 A1 | * | 7/2004 | Wolff | 705/9 |

FOREIGN PATENT DOCUMENTS

| | | |
|---|---|---|
| EP | 0742527 | 11/1996 |
| WO | WO 03/067425 | 8/2003 |

OTHER PUBLICATIONS

Search Report.

* cited by examiner

*Primary Examiner*—John Chavis
(74) *Attorney, Agent, or Firm*—Milbank, Tweed, Hadley & McCloy LLP

(57) ABSTRACT

A library of jobs is created, with the jobs performing predetermined functions. The jobs include a termination indication, which is success or failure. Input file formats of known file types are determined and a job stream to process the input files is constructed of the jobs linked according to the termination success or failure of the preceding job.

9 Claims, 11 Drawing Sheets

Stream Status Manager

Job

METHOD AND SYSTEM FOR DATA FILE PROCESSING

BACKGROUND

The invention relates to the field of data processing, and more particularly to the field of environments for software application development using software code libraries.

A number of industries, and in particular the securities, finance and banking industries, process multiple input data files every day to produce reports and other types of output files. Because this may be a regular scheduled requirement, the software code to process the input files is often a monolithic software application that is developed and rigorously tested before it is deployed. Once deployed, the application is generally used on a regular basis and the developer moves on to the next project. This means that any change to the monolithic application requires a developer to first recall or understand how the monolithic application works, write new code to accomplish the needed change, integrate the new code into the application, test the monolithic application with the new code, and re-deploy the application. Each change to the application requires these steps, and the resulting cost and time can be extensive.

What is needed is an environment that supports rapid development and testing of software applications, and that also supports modification and deployment of the applications.

The preceding description is not to be construed as an admission that any of the description is prior art relative to the present invention.

SUMMARY OF THE INVENTION

In one embodiment, the invention provides a system and method for software application development. The system and method characterize the file format and data structure of at least one known input file type, and create a library comprising a plurality of jobs. Each job is generally configured to perform a predetermined function and each job includes an indicator of job termination. The indicator is either termination success or termination failure, and the jobs are configured for linking according to the indicator of job termination. At least one of the jobs is configured to read the file format and data structure of the known input file and convert that input file to another file format or data structure.

In another embodiment, the invention provides a system and method for software application development, wherein the library of jobs comprise at least one job configured for extracting data from a file.

In another embodiment, the invention provides a system and method for software application development, wherein the library of jobs comprise at least one job configured for archiving files.

In another embodiment, the invention provides a system and method for software application development, wherein the library of jobs comprise at least one job configured for loading files.

In another embodiment, the invention provides a system and method for software application development, wherein the library of jobs comprise at least one job configured for messaging.

In another embodiment, the invention provides a system and method for software application development, wherein the library of jobs comprise at least one job configured for transforming data in a file.

In another embodiment, the invention provides a system and method for software application development, wherein the library of jobs comprise at least one job configured for validating data in a file.

In another embodiment, the invention provides a system and method for software application development, further comprising creating a job stream library. The job stream library comprises at least one job stream, and comprises individual jobs from the library of jobs. The at least one job stream in the job stream library includes an indicator of job termination, wherein the indicator is either termination success or termination failure.

In another embodiment, the invention provides a system and method for software application development, further comprising adding jobs to the library of jobs.

In another embodiment, the invention provides a system and method for processing a data file. The system and method select a plurality of jobs from a library of jobs. Each job includes an indicator of job termination, wherein the indicator is either termination success or termination failure. The system and method create a job stream, the job stream comprising the plurality of jobs linked to each other according to the indicator of job termination. The system and method create a manager, receive the data file, and process the data file with the job stream using the manager.

In another embodiment, the invention provides a system and method for processing a data file, wherein receiving the data file comprises receiving the data file as an e-mail attachment.

In another embodiment, the invention provides a system and method for processing a data file, wherein receiving the data file comprises receiving the data file using file transfer protocol.

In another embodiment, the invention provides a system and method for processing a data file, wherein receiving the data file comprises receiving the data file using hypertext transfer protocol.

In another embodiment, the invention provides a system and method for processing a data file, wherein receiving the data file further comprises checking security access for the data file.

In another embodiment, the invention provides a system and method for processing a data file that further comprises creating a visual representation of the plurality of jobs and the interlinking of the jobs.

In another embodiment, the invention provides a system and method for processing a data file that further comprises creating an extensible markup language document corresponding to the job stream.

The foregoing specific objects and advantages of the invention are illustrative of those which can be achieved by the present invention and are not intended to be exhaustive or limiting of the possible advantages that can be realized. Thus, the objects and advantages of this invention will be apparent from the description herein or can be learned from practicing the invention, both as embodied herein or as modified in view of any variations which may be apparent to those skilled in the art.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

The various embodiments described below provide a multi-platform integrated development and run-time environment designed for building robust applications. A process for creating this environment is also described. When developers build and run applications within this environment, they do not write code or learn a new language. Instead, they simply reuse existing components, or Jobs, by passing them specific input and instructions on what data operations need to be performed.

I. Example System

Figure 1:
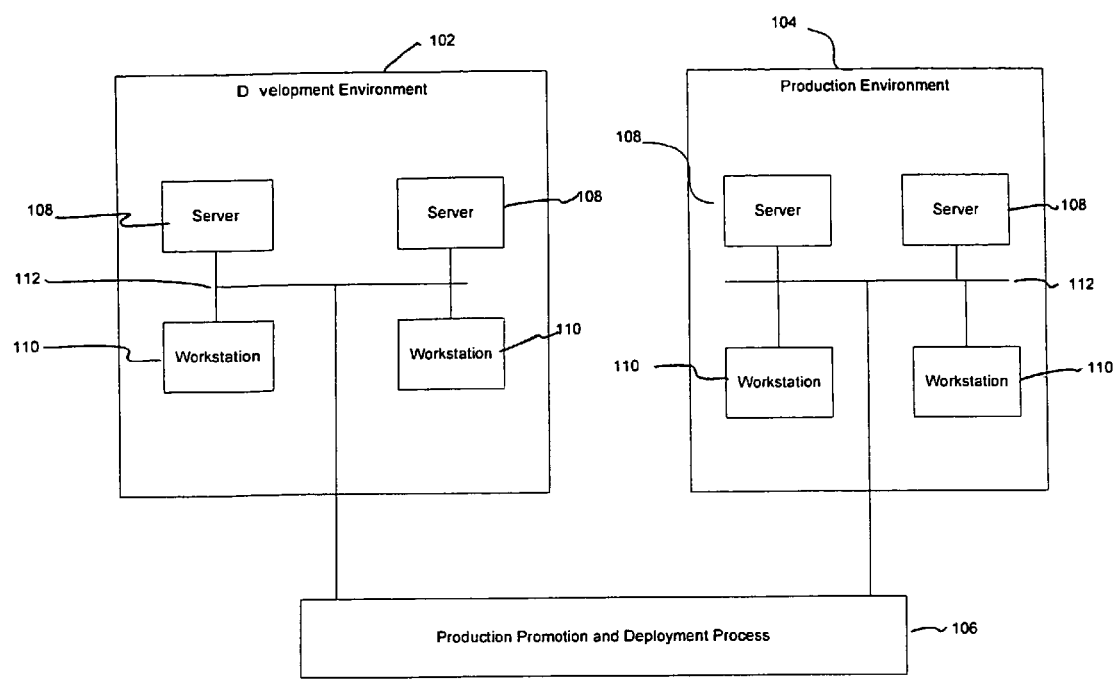
FIG. 1 illustrates an example system according to an embodiment of the invention.

A system 100 according to an embodiment of the invention is illustrated in FIG. 1. System 100 includes a development or staging environment 102, and a production environment 104. As illustrated, the two environments are separated to reduce the possibility of faults in the production environment caused by development changes. A production promotion and deployment process 106 is provided to allow installation of software from the development environment to the production environment.

Within each environment 102, 104, servers 108 and workstations 110 are connected by networks 112. Servers 108 and workstations 110 are typically computers with CPUs, fixed and removable memory, input/output devices, and software code storage media. They are also typically configured for connection to networks 112 by a network interface, such as a wired or wireless connection. Servers 108 and workstations 110 may be individual computers, such as desktops and laptops, or they may be larger interconnected workstations, mainframes or dynamic grids of computers. Although not specifically illustrated, it is common for environments 102 and 104 to have connection to external networks and facilities, such as the Internet, with associated e-mail, and file exchange capabilities.

Servers 108 and workstations 110, may have installed operating systems, such as Unix®, Linux®, and Windows®, and may also operate with or run Java® and other programs.

II. Elements of the Environment

The environment of system 100 is generally made up of three working areas: Maintenance, Station and Terminal. Each of these areas is described in greater detail below. These areas are virtual and do not necessarily correspond to any particular piece of hardware. The developer generally works in the Maintenance area to develop a Job Stream. The resulting application Job Stream generally runs in the Station area. A Job Stream can be considered as a series of Jobs, linked according to the success or failure of the preceding Job. Jobs and Job Streams are more fully described below. Users can use the Terminal area to approve Job Streams that are on hold.

A. Maintenance

In the maintenance area, developers create and troubleshoot their Job Streams, define source files, and test their applications. The maintenance area may include options such as: Jobs, Job Stream, Files, Sources, Groups, Params, Dirs, and Search. Each option is described generally below.

1. Jobs: A Job is generally considered as an application building block. It represents a function of the system. Jobs are reused and personalized by the parameters used to define their behavior. Within the environment, there is an extensive list of Jobs to choose from. New Jobs can also be created on an as-needed basis.

Following an assembly line analogy, Jobs are the workers along the line. They perform tasks on the files. The environment contains many Jobs that perform various tasks from file conversions to data manipulation to calculations. There are also Jobs that communicate with databases, mainframes and external FTP, email or paging systems.

Jobs can be created easily to extend the environment's functionality. Most Jobs fall into one of the following categories: Messengers—used for communicating with users via email or their pagers; Transformers—used for manipulating file contents; Converters—used for converting data from one format to another; Extractors—used to filter data; Accessors/ Modifiers—used for communicating with other systems to retrieve data used for querying and modifying database tables; and File operators—used to compress, expand, delete, create, compare and append files.

2. Job Stream: There is a correlation between a Job Stream and an input file. The Job Stream is generally considered as a processing plan for that input file, and the Job Stream defines the steps needed to produce a final output file from the initial input file. A Job Stream is a tree-based structure made up of Jobs. The branches of the Job Stream tree allow for parallel processing, and the Job Stream is completed when all branches are done processing.

Job Streams are analogous to an assembly line. A Job Stream is formed by tying or linking a series of Jobs together. Each Job may be a success Job or a failure Job. Success Jobs are carried out if their parent Job completes successfully. Failure Jobs are carried out if their parent Job fails. There can be many success or failure Jobs for a single Job Stream, and both success and failure Jobs can have their own success and failure Jobs as well. This can form a tree structure with branches and nodes. A Job Stream may contain a single branch representing a sequential flow of processing, or it may contain multiple branches representing parallel flows. In effect, the Job Stream serves as a pseudo flow chart of success and failure Jobs. The root of the tree is a single Kickoff Job. This Kickoff Job is triggered when the input file is received.

In addition to individual failure Jobs, a developer can also add a default failure Job. A default failure Job is an optional Job that is executed when any Job fails and doesn't have its own failure Job.

Job Streams are stored as XML documents in a database, and runtime instances of a Job Stream are archived. Errors for failed Jobs are stored with the Job Stream for later inspection. Job Stream execution can also be monitored graphically in real time.

The developer can test the entire Job Stream, and Jobs can be individually tested as the developer builds the Job Stream. For each Job Stream, a user can view its history, view its source, generate a Visio diagram based on the stream tree structure, check the stream out of source control and copy the entire Job Stream to another file. The Job Stream History shows a log of changes that were made to the stream. It shows the user name, the action taken (inserting a Job, updating a Job, deleting a Job), and the date the action was performed.

Sometimes users may find themselves in the position of needing to create two similar Job Streams whose differences may be the last few Jobs. Instead of having to laboriously re-do a stream of Jobs they have created for a first Job Stream, they can replicate the Job Stream with a Copy Stream tool.

3. Files: The environment is file-oriented, and is best suited to process tab-delimited files. Therefore, when an input file is in some other format, one of the converter Jobs or the CharReplacer Job is generally used to replace the delimiters with a tab. Input files represent physical files that are delivered to the environment for processing and to create an output file.

Data files are sent into the environment by the users. An input file can enter the environment in at least one of three methods: File Transfer Protocol ("FTP"), Email, and Hypertext Transfer Protocol ("HTTP") Upload. For each file, one of these methods is used. Each of these methods has its own security measures in place to minimize the chances of starting a Job Stream with incorrect data.

The FTP server is a main data path into the environment, and it is used indirectly by the Email and HTTP functions. Direct FTP into the environment is allowed if the file being delivered is marked for FTP delivery. The FTP server performs various entitlement checks. For FTP submissions, the PUT command is only accepted if the file passed all the entitlement checks.

When a developer or user indicates that a file's delivery method is FTP, it means that the environment will be expecting the input file via FTP. For security reasons, the environment supports the basic FTP commands. For each client computer that will be connecting to the environment to retrieve or drop off files, the hostname and/or IP Address of the client computer is generally included in a Valid IPs field. If the user is not authorized to submit the file, an error is displayed. However, if the file is a valid submission, then the file is accepted and the FTP session is closed. The file is then handed over to the Station for processing. This protects against users sending files from unauthorized computers.

As discussed below, each source in the environment has a Client Group associated with it. If e-mail is the selected delivery method, then only members of that client group can email that file into the environment. After files are posted into the environment, a user will receive an email for each file indicating that the file was either successfully deposited and processing has begun, or rejected because of security permissions.

A user sends a message with a file attachment to a particular address. A custom route exists that forwards all mail addressed to that particular address to a designated mail server. This mail server resides on the machine that the environment is hosted on. A user account (and therefore a mail account) exists on this machine for a user ID. Following UNIX mail conventions, a forward file is created that directs mail sent to the user ID to be forwarded to a Java application. This Java application, EmailRelay is executed and opens a connection to a port (the FTP server) and effectively executes a PUT for the attached file in the email message. The FTP server then handles processing of the input file as usual.

When HTTP is the selected delivery method, then the standard HTTP File Upload mechanism is used for submitting files into the environment. This is done through an interface provided in the Terminal area. HTTP Upload confirmations are displayed online in the Terminal area.

4. Sources: A source is a storage container for a logical grouping of input files—similar to a folder or directory. Each source is associated with a systems group and each source has a designated contact person. Members of the systems group that own the source may add input files and create Job Streams.

A developer can edit source information. If the input files will be delivered to the environment via FTP, then the developer provides login information and valid IPs for the machines used to transfer the files using FTP. Input files belonging to the source using the FTP delivery method are authenticated against this information. If a computer whose IP is not listed is used to transfer the files using FTP, then the file is rejected.

5. Groups: A Group is a logical set of related users—there can be as few as one user or as many as hundreds of users per group. Generally, there are two types of user groups in the environment: client groups and systems groups. In a client group, users interact with the environment by sending data files to be processed. In a systems group, users define the processing instructions for the data files the client group may send.

A systems group is defined for a source while a client group is defined for input files. One purpose of the client group is to establish who can send the file into the environment if the delivery type is email or HTTP. Each group owns its source files and application Job Streams, and users of a given group can alter or test their applications. It is not necessary to have two distinct user groups and in some circumstances a single group may be appropriate.

A group may be divided into users and managers. The individual who requests the creation of a new group may be automatically the manager of the group with permission to add and delete users from the group as well as process approvals.

6. Params: Sometimes the developer or user will find that they reuse a common parameter-value pair in different Jobs in their Job Streams. Instead of recreating the parameter each time for different input files or even for different Jobs in the same Job Stream, the user can save the parameter as a constant in the Params module.

Common parameters can be created and used by everybody, and their values are replaced at runtime. This promotes saving common data in one place. If the parameter value changes, the user will only have to change it once in the Params module.

7. Dirs: There are three logical storage regions or directories from which files and Jobs can be promoted. These regions are similar to test, staging and production environments on the mainframe. The difference is that these three directories—called bronze, silver and gold for reference—are all physically located on both staging and production machines. Users can find files in the bronze, silver or gold directories using the directory browser. Typically, the different directories indicate stages in the level of file permanence. Bronze would be less permanent than silver, which would be less permanent than gold.

8. Search: The environment provides developers and users the ability to search for all occurrences of a text string. They can also narrow their search by specifying a source or specific input file. If they want to search for all occurrences of a Job or see how Job Streams use that Job, or if they want to search and find out what Jobs are using specific parameters, they can also accomplish that. The search results list all the Job Streams and the specific Job containing the query string.

B. Station

The Station is the area where the Job Streams run. Developers and users can use the Station to monitor the status of their Jobs, view all currently running Jobs, and see the results of their Jobs. Station is similar to a development tool's runtime environment—it is where developers can run their Job Streams in real time.

Within the Station, a Job Manager program manages a single Job Stream and the Jobs defined within it. It is the Job Manager's responsibility to start the Kickoff Job, record successes and failures and kick off the respective Jobs. Many Job Managers may be running within the Station at any one time.

A Job Manager is started within the Station to process a specific file. The Job Manager manages the interaction between a Job Stream and the Jobs defined in it. Job Stream definitions are stored in XML format in a database and are loaded when the Job Manager starts. This Job Stream provides the instructions that the Job Manager will follow in processing the file.

The Job Manager uses the Job Stream to determine the Jobs to start and manage. Managing a Job (or a set of Jobs) entails the following steps:
1. Get the Job definition(s) (XML format)
    a. For a specific Job such as the Kickoff Job or Default Failure Job
    b. For all success Jobs of a specific Job
    c. For all failure Jobs of a specific Job
2. Create a runnable Job from the Job's XML definition using the Job Factory via Java's Reflection API
3. Register as the listener for Job Events from each Job
4. Execute each Job in a thread and wait for notifications (events)
5. If a Job succeeded
    a. Record it's state in the Job Stream
    b. Go to step 1b for that Job
6. If a Job failed
    a. Record it's state in the Job Stream
    b. Record the error message for the Job
    c. Go to step 1c for that Job
    d. If there are no failure Jobs for that Job, execute the Default Failure (step 1a) if it exists
7. Continue running/managing Jobs until there are no more Jobs to run following the branches in the Job Stream.
8. Record the state of the Stream in the database
    a. State is COMPLETED SUCCESSFULLY if no Jobs failed
    b. State is COMPLETED WITH FAILURE if at least one Job failed
    c. State is FAILED if an unexpected error occurred while processing Within the Station, a developer or user can review how a Job Stream has performed in the past by checking its execution record in stream history. For any given Job Stream, the status, run and stop times, and runtime filenames are listed or available.

A developer or user can also find out more information by selecting any of the run times. This will give them the tree view of the Job Stream and a table view of all the Jobs in the stream with their status and run times. If a Job failed, they can also review the error message.

C. Terminal

Users log into the Terminal area, and are allowed to view the pending approvals for their applications or upload files to the Job Stream. Any user with proper permissions to the Client Group can upload a file and start processing of that file.

As discussed above, there are System Groups and Client Groups. A file belongs to a System Group and a Client Group. For each file, there is a System Group who is responsible for creating the Job Stream to process the file, and there is a Client Group that sends the file into the environment.

Sometimes, the data in the file may need to be verified for compliance or accuracy before it is processed. For these cases, the developers can include an ApproverJob in the Job Stream.

For Job Streams with an Approver Job, the Job Stream will not run until a user from the Client Group logs into the Terminal, views the file that is waiting to be sent into the environment for that Job Stream and approves it.

D. Other Features

Changes to database tables are logged for audit purposes. This enables an Administrator to track changes. For changes, a userId, timestamp and change description is recorded.

In addition to auditing changes, when a Job Stream is executed in the Station, it is archived. This archived Stream contains the status for each Job executed, the time it ran and completed as well as any error messages that may have occurred.

III. Example Methods

A. Creating an Environment

Figure 2:
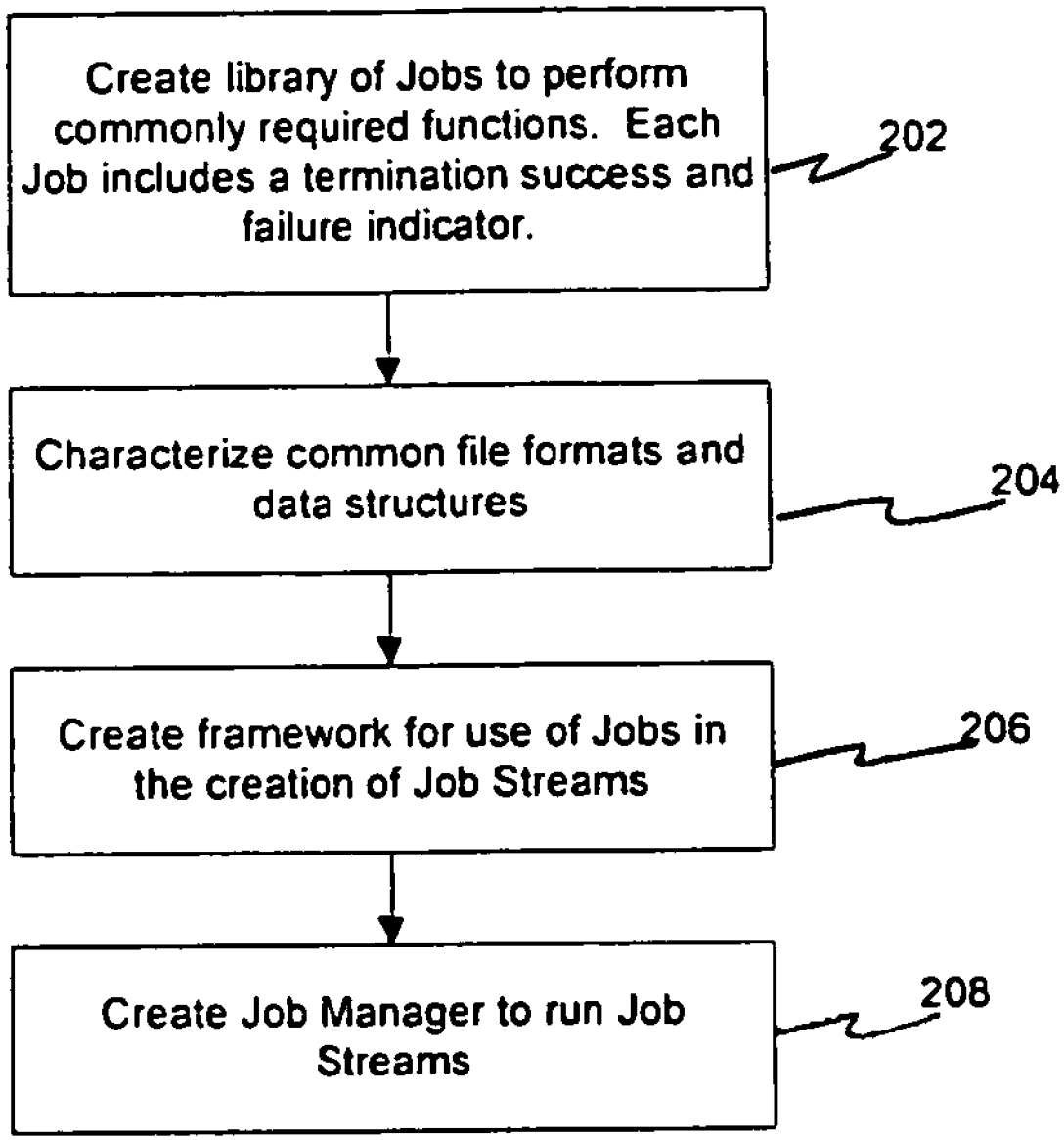
FIG. 2 illustrates steps in an example method according to an embodiment of the invention.

FIG. 2 illustrates steps in creating an environment according to one embodiment of the invention. At step 202, a library of Jobs, performing commonly required functions, is created. Each Job has a termination success and termination failure indicator.

At step 204, common file formats and data structures are characterized. For example, this may include things like determining the file format used for mainframe files, or the format used for Excel spreadsheets. It may also include determining the formats of commonly used files, such as lists of securities, lists of customers, or databases of customers identification information.

At step 206, a framework is created for the use and reuse of Jobs in the creation of Job Streams. This framework may be a browser interface with supporting Java code that is connected to electronic databases, e-mail servers, file servers and a number of other information media.

At step 208, a Job Manager is created to run the Job Streams. Much like the framework, the Job Manager may be a browser interface with supporting Java code and connections to databases, servers and sources.

Other than the occasional need to add to or modify the Jobs created at step 202, and characterize additional or new file formats and data structures at step 204, the process illustrated in FIG. 2 to create the environment is performed a single time and the resulting environment is then repeatedly used to link Jobs into Job Streams.

B. Creating a Job Stream

As a particular example, a client wants to know which customers own shares of any of four different securities, and they want that list of customers in an Excel file that is sent to them as an e-mail attachment.

The trading symbols or "tickers" of the four different securities are stored in an Excel file. The Excel file looks like the following:

| Ticker |
|--------|
| NE     |
| ETM    |
| NUL    |
| IIF    |

The client also has a fixed width "position" file that is stored on a mainframe. That mainframe file includes trades for all customers. A sample of the mainframe file looks like:

| 1 | 9545EDV   | 9973.9422 | 57.15  | 9/4/2003 3:07:07 AM    | Jul. 28, 2003 12:56:56 PM |
|---|-----------|-----------|--------|------------------------|---------------------------|
| 2 | 8049NJ    | 6989.3352 | 24.58  | 6/3/2003 11:49:02 AM   | May 19, 2003 5:12:32 PM   |
| 3 | 8858RBS^H | 7904.6544 | 72.24  | 12/12/2002 9:23:41 AM  | Jan. 3, 2003 1:59:53 AM   |
| 4 | 3543CHK^  | 6297.1813 | 57.53  | 28/2003 11:24:08 AM    | Feb. 28, 2003 2:28:09 AM  |
| 5 | 7177KF    | 4915.3881 | 10.45  | 9/22/2003 4:24:33 PM   | Sep. 3, 2003 10:44:27 PM  |
| 6 | 1031BOW   | 5735.9749 | 74.89  | 6/27/2003 5:03:56 AM   | Dec. 15, 2002 11:26:33 AM |
| 7 | 5459NVP^B | 2279.8076 | 59.63  | 15/2003 4:50:52 AM     | Sep. 12, 2003 11:41:55 PM |

The client also has a database table with particulars on each customer. The layout of that table is:

| CustomerID | numeric |
|------------|---------|
| Title      | text    |
| FirstName  | text    |
| LastName   | text    |
| Address    | text    |
| City       | text    |
| State      | text    |
| Zip        | text    |
| SSN        | text    |

As indicated above, most of the Jobs in the environment require a tab-delimited text file format, and the Excel file is not tab-delimited. Therefore, the developer knows that one of the first required steps is conversion of the Excel format file to a tab-delimited text format file. This is chosen as the kickoff Job in the Job Stream, and is accomplished with an Excel-Convertor Job. An example list of Jobs is provided later in the specification, and the ExcelConvertor Job is one of the described Jobs.

Assuming that the Excel file is successfully converted, the next step is adding a job to pull the file from the mainframe. This is accomplished by adding a FTPRetriever Job, which puts the information into a data file.

Again, assuming that the ftp is successful, the next step is adding a Job to convert the data file into tab-delimited text format file. This is accomplished by adding a Converter Job to the Job Stream. The Converter Job is also described in the list of Jobs later in the specification.

Many fixed width files (such as the mainframe file) use spaces as padding. Therefore, assuming that the file conversion in the previous step is successful, the next step is removing space padding. This is accomplished by adding a SpaceRemover Job to the Job Stream. The SpaceRemover Job is also described in the list of Jobs later in the specification.

Using the result of the SpaceRemover Job, the developer is now able to generate a listing of all CustomerIDs that hold shares of any of the four ticker symbols. This is accomplished by adding a FileSearcher Job to the Job Stream. The FileSearcher Job is also described in the list of Jobs later in the specification.

The result file of the FileSearcher Job looks like:

| TradeID | CustomerID | Ticker | Shares    | ExecutionP | OrderDate          | SettlementDate       |
|---------|------------|--------|-----------|------------|--------------------|----------------------|
| 52      | 5691       | IIF    | 5281.0493 | 8.63       | Oct. 21, 2002 1:08 | Aug. 3, 2003 1:12    |
| 98      | 5398       | IIF    | 1692.4691 | 93.51      | May 9, 2003 7:45   | Aug. 24, 2003 11:55  |
| 116     | 3776       | IIF    | 7205.7046 | 62.67      | Jan. 4, 2003 3:09  | Jun. 2, 2003 18:33   |
| 210     | 7633       | IIF    | 6887.4298 | 17.76      | Dec. 25, 2002 6:55 | Aug. 24, 2003 2:26   |
| 355     | 6226       | ETM    | 6342.2917 | 40.48      | Nov. 22, 2002 19:49 | Mar. 18, 2003 17:02 |
| 356     | 3446       | IIF    | 4596.7868 | 59.1       | Sep. 6, 2003 23:35 | May 27, 2003 1:04    |
| 430     | 702        | IIF    | 8696.9634 | 92.23      | Apr. 22, 2003 16:31 | May 2, 2003 23:39   |
| 792     | 4545       | ETM    | 6241.5818 | 56.4       | Jan. 22, 2003 21:33 | Jul. 3, 2003 9:17   |
| 819     | 8432       | ETM    | 3718.1597 | 59.21      | Aug. 19, 2003 23:06 | Jan. 12, 2003 23:23 |
| 1009    | 7509       | IIF    | 3759.4299 | 66.04      | Sep. 14, 2003 21:17 | Apr. 18, 2003 5:58  |
| 1452    | 75         | IIF    | 7966.8693 | 29.75      | Nov. 23, 2002 5:01 | Oct. 8, 2002 19:06   |
| 1526    | 7167       | IIF    | 2444.3899 | 76.77      | Aug. 21, 2003 23:07 | Nov. 12, 2002 15:38 |
| 1556    | 9435       | IIF    | 6966.7726 | 92.11      | Feb. 8, 2003 22:04 | Apr. 16, 2003 0:11   |
| 1687    | 3195       | ETM    | 9792.8385 | 86.03      | Dec. 24, 2002 14:52 | Oct. 5, 2003 7:04   |

This file has CustomerID, but does not show who the customer is or any particulars on the customer. The next step is to use the CustomerID and retrieve the desired customer information from the mainframe file. This is accomplished by adding a DatabaseSelector Job to the Job Stream. The DatabaseSelector Job is also described in the list of Jobs later in the specification.

The result of the DatabaseSelector Job now has all of the desired information, but it is not in Excel format. To make that change, the developer adds a TextToExcel Job to the Job Stream. The TextToExcel Job is also described in the list of Jobs later in the specification.

The result of the TextToExcel Job is an Excel spreadsheet file (all information is fictional) and looks like:

| 5691 | Mr. Brian | Vosz | 198 Campbells Point Rd | Donaldsonville | LA | 70346 | 892-86-1382 |
| 5398 | Ms. Mark | Clifford | 901 Fieldstone Farms Ct | Pittsburgh | PA | 15201 | 788-67-7982 |
| 3776 | Mr. Donald | Ritz | 159 Pheasant Rd | Storm Lake | IA | 50588 | 734-20-5920 |
| 7633 | Ms. Anita | Schumann | 966 West Cypress Lake St | Bourbonnais | IL | 60914 | 625-18-2705 |
| 6226 | Mr. Christine | Pettigrew | 713 Springhouse Ln | Glen Allen | VA | 23060 | 457-39-8813 |
| 3446 | Ms. Walter | Danowski | 198 Sam Tillery Pike | Pennsville | NJ | 08070 | 273-80-8824 |

The developer needs to have this Excel file sent to the client as an e-mail attachment. This is accomplished by adding an EmailContacter Job to the Job Stream. The EmailContacter Job is also described in the list of Jobs later in the specification.

There is also interest in handling Job failures, and it is possible to have individual failure Jobs, as well as a default failure Job. The developer specifically wants to know if the DatabaseSelector Job fails, and also wants a general e-mail message for any other Job failures. To accomplish this, the developer adds two BeeperContacter Jobs for the specific failure and a general failure Job.

Figure 3:
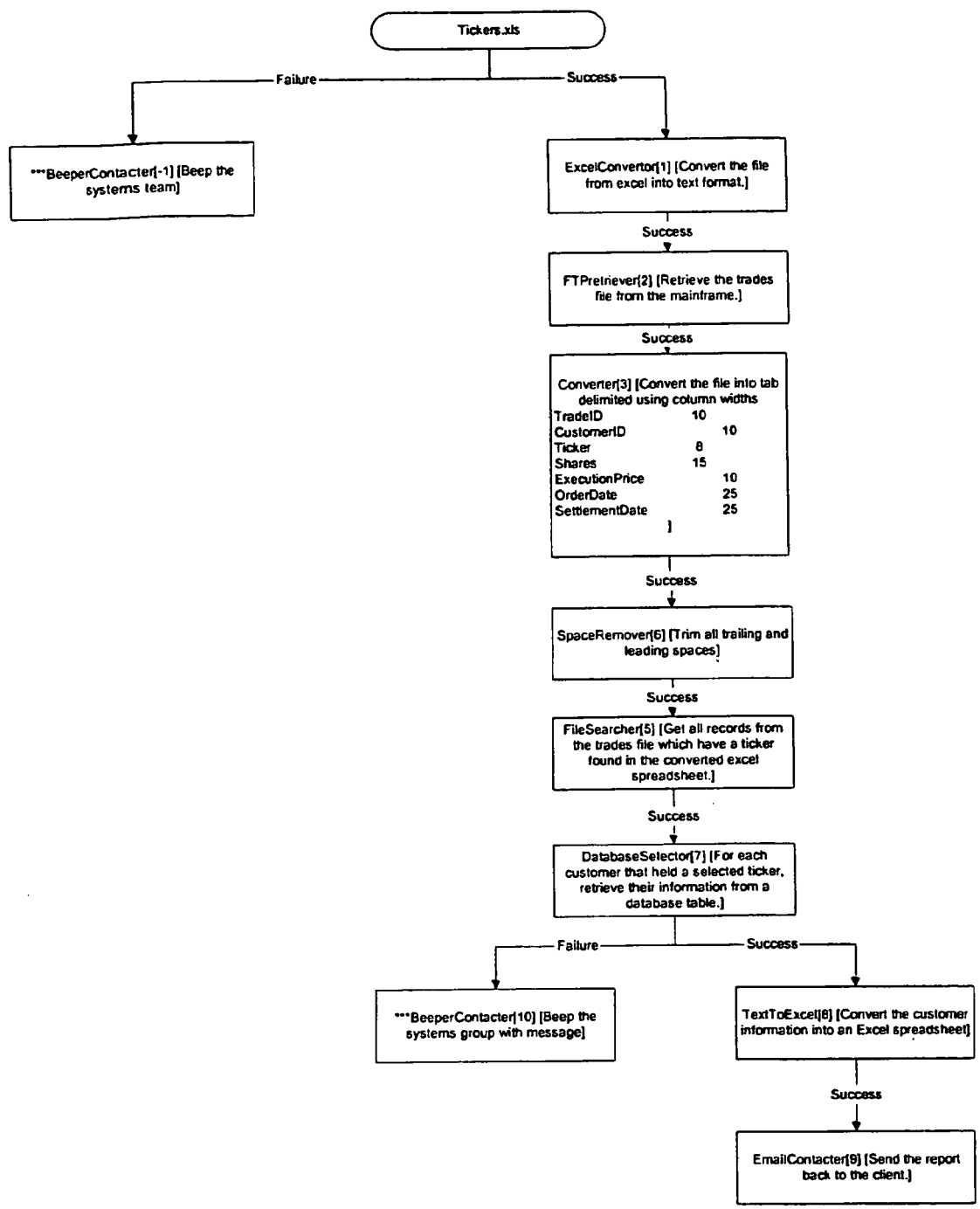
FIG. 3 illustrates an example flowchart chart produced using an embodiment of the invention.
Figure 4:
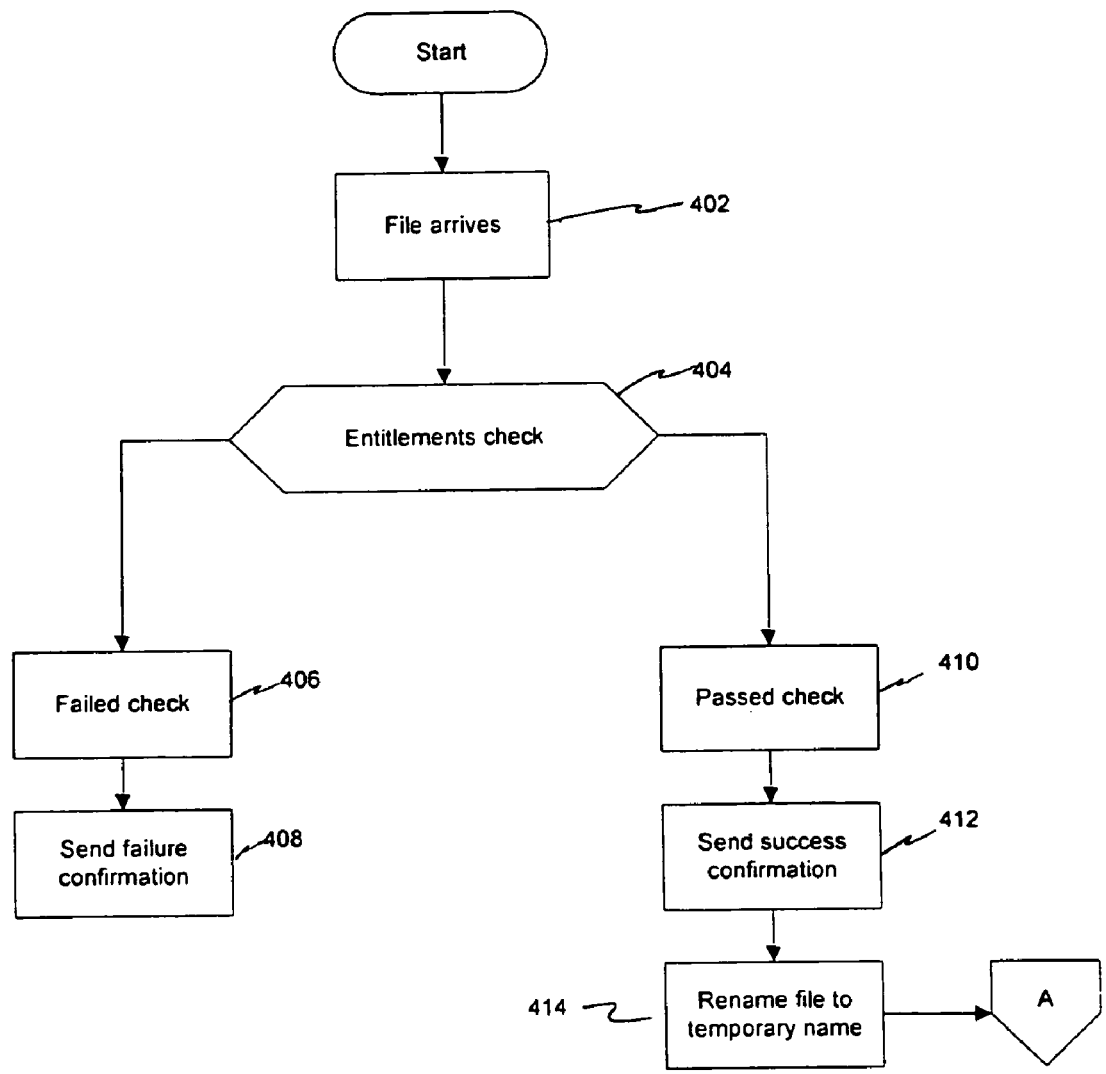
FIG. 4 illustrates steps in an example method according to an embodiment of the invention.
Figure 5:
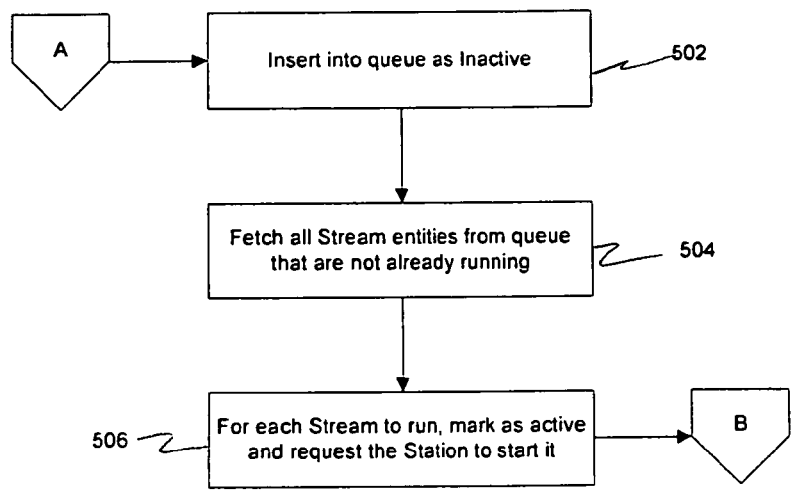
FIG. 5 illustrates steps in an example method according to an embodiment of the invention.
Figure 5:
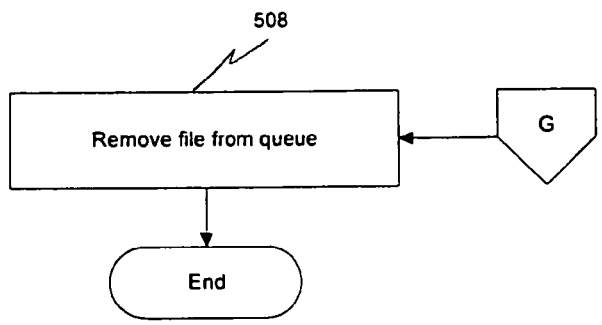
Figure 6:
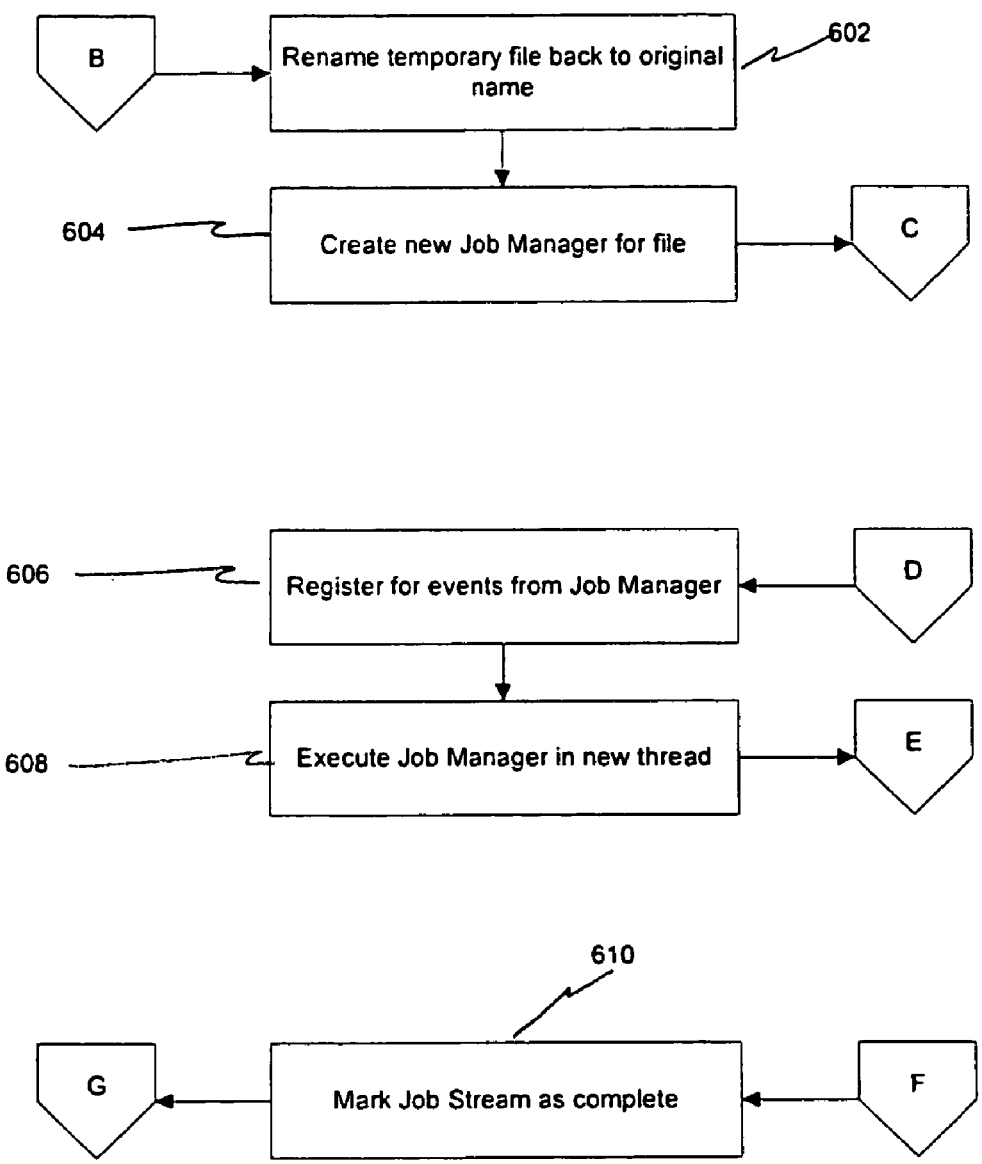
FIG. 6 illustrates steps in an example method according to an embodiment of the invention.
Figure 7:
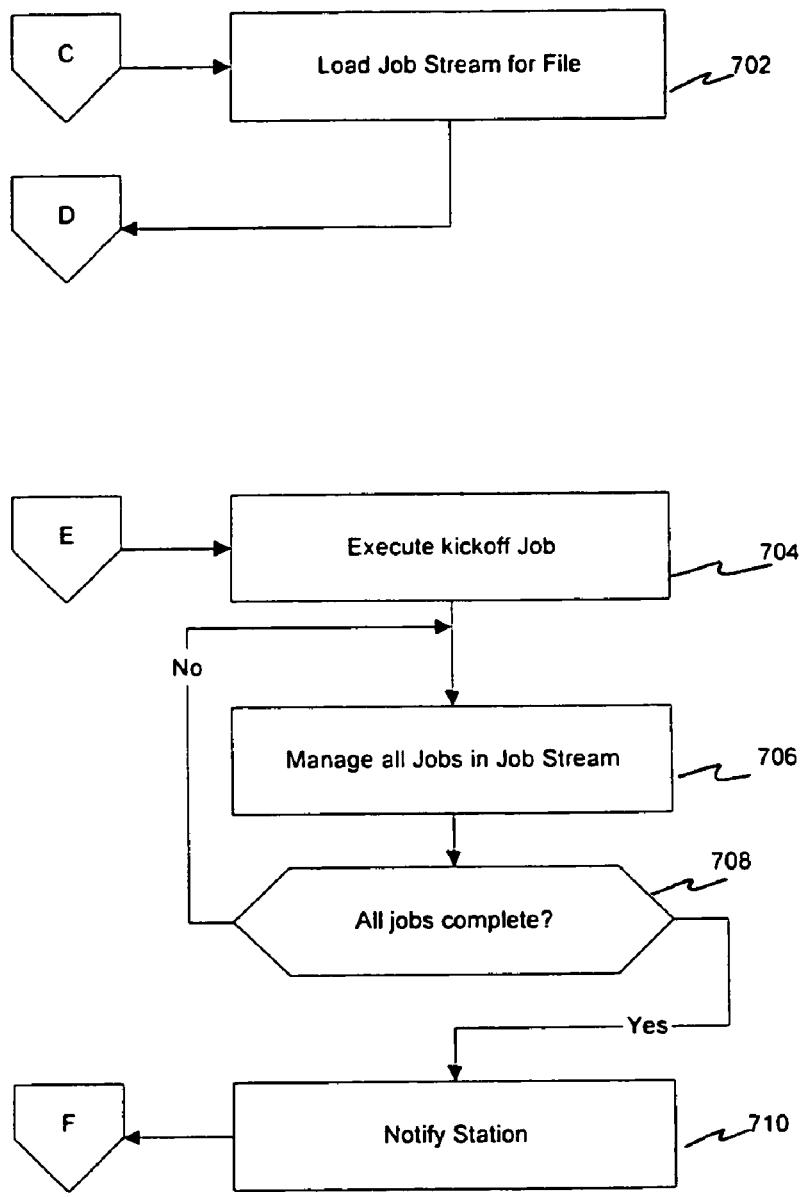
FIG. 7 illustrates steps in an example method according to an embodiment of the invention.
Figure 8:
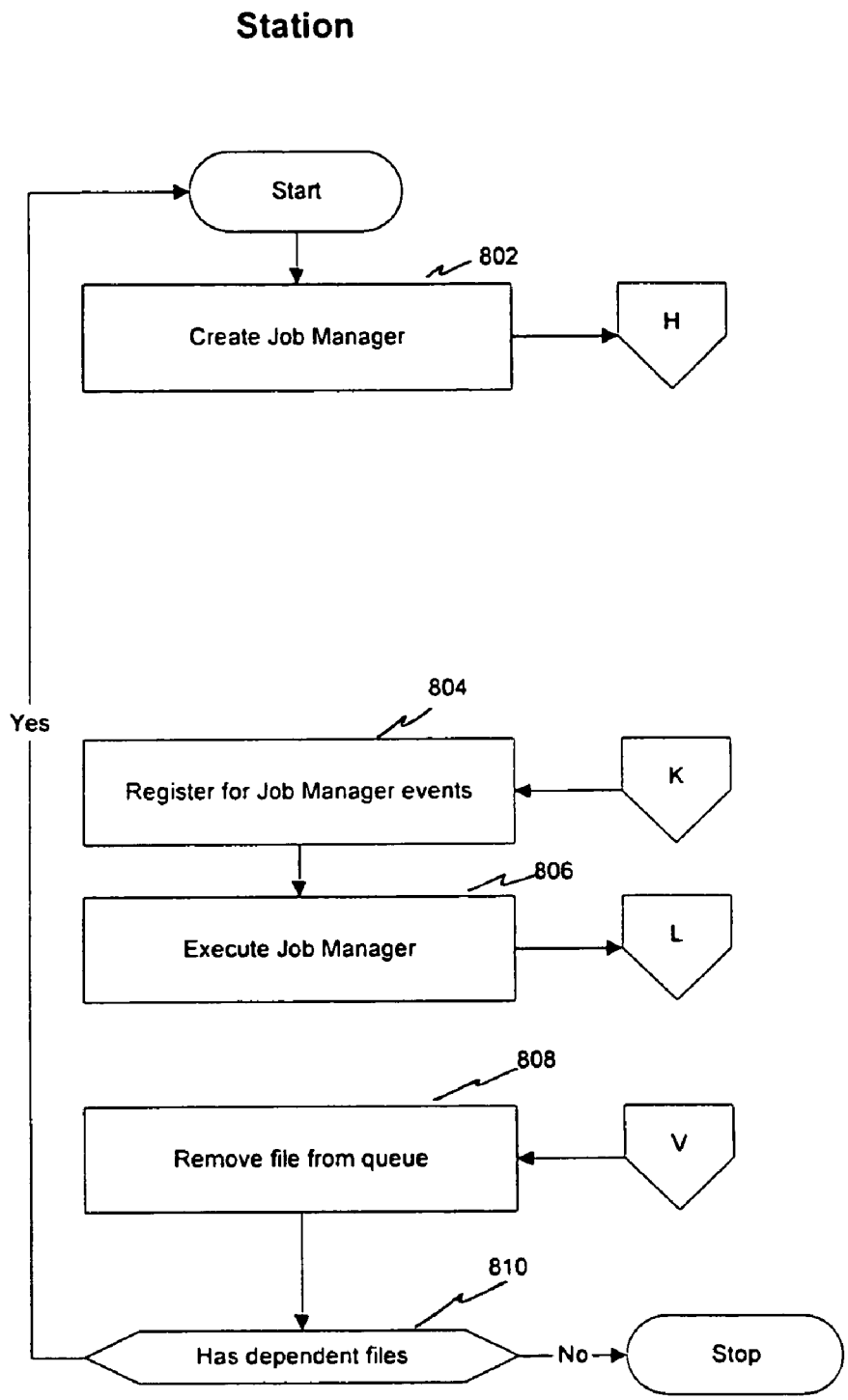
FIG. 8 illustrates steps in an example method according to an embodiment of the invention.
Figure 9:
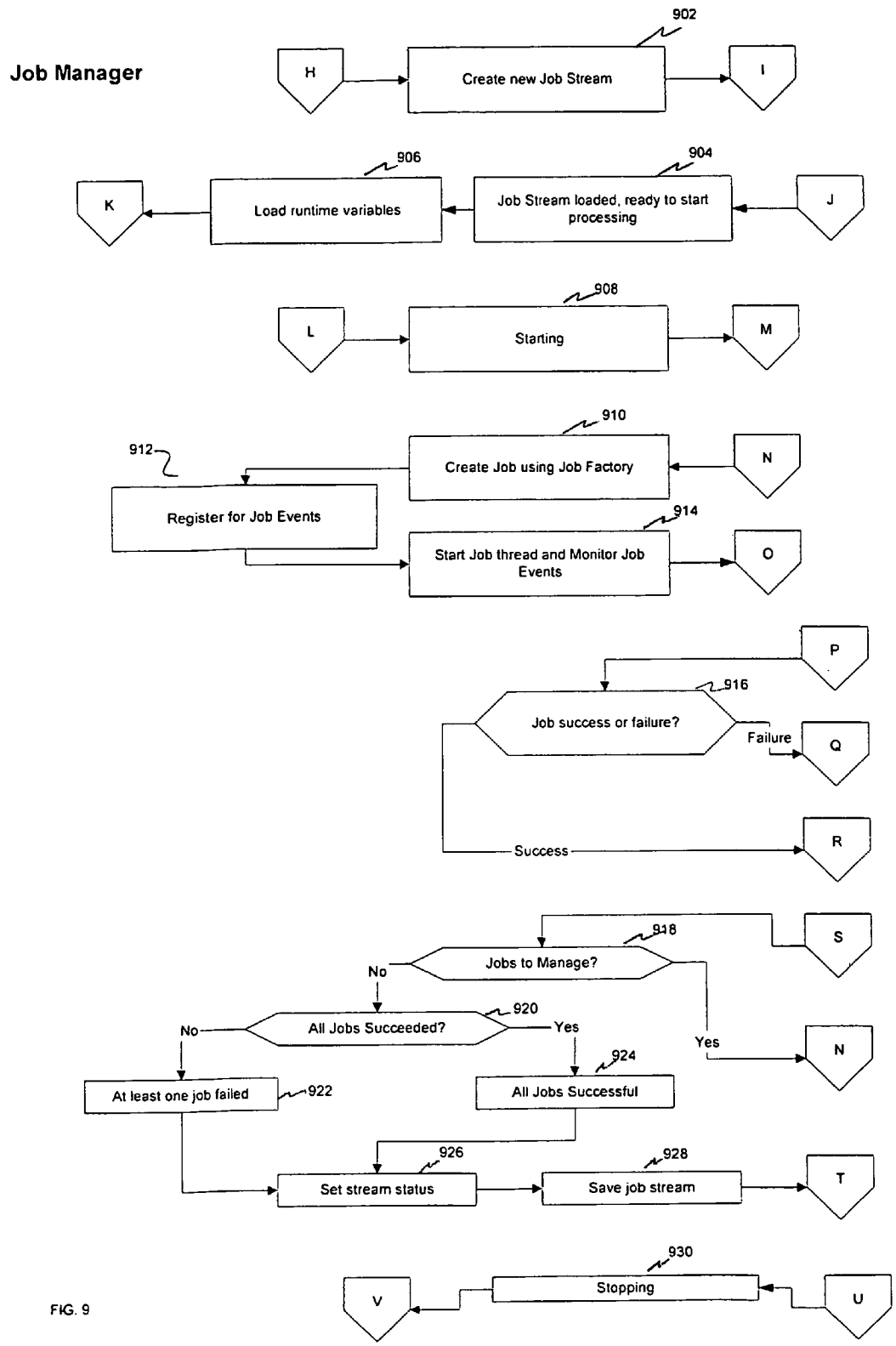
FIG. 9 illustrates steps in an example method according to an embodiment of the invention.
Figure 10:
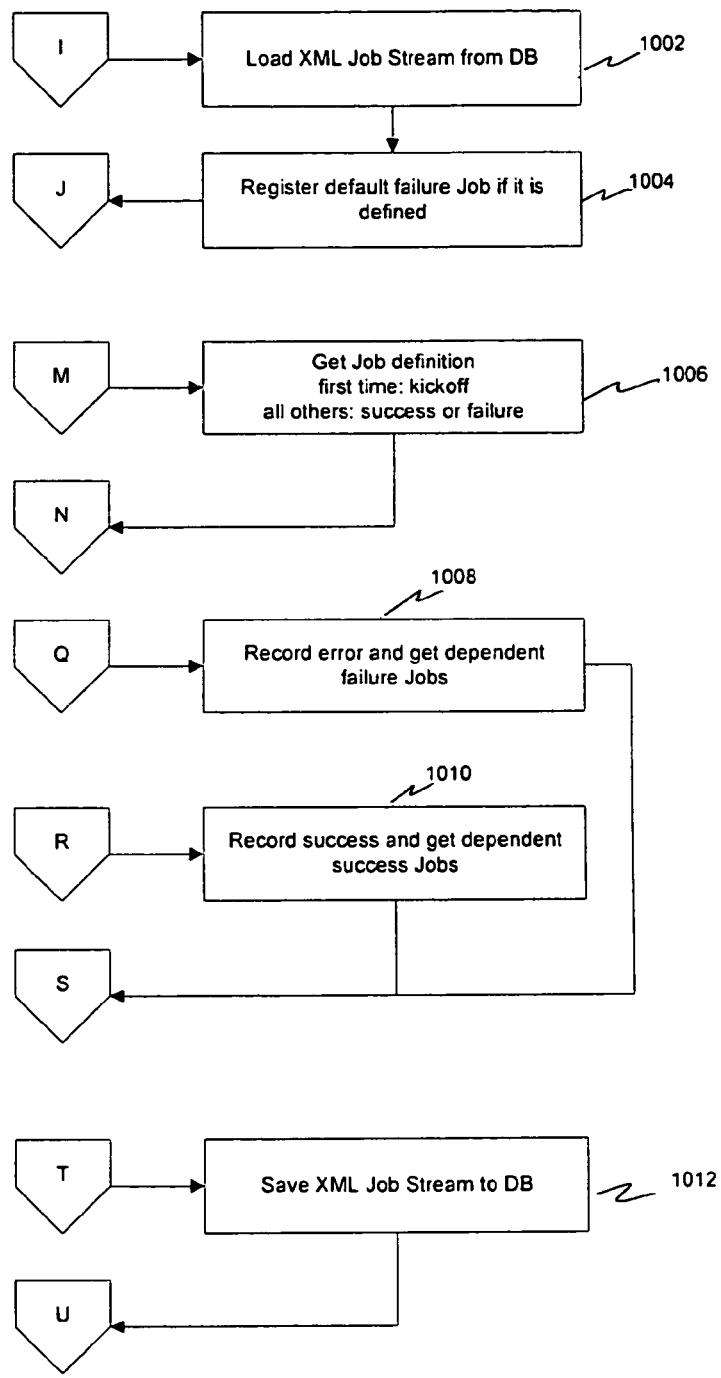
FIG. 10 illustrates steps in an example method according to an embodiment of the invention.
Figure 11:
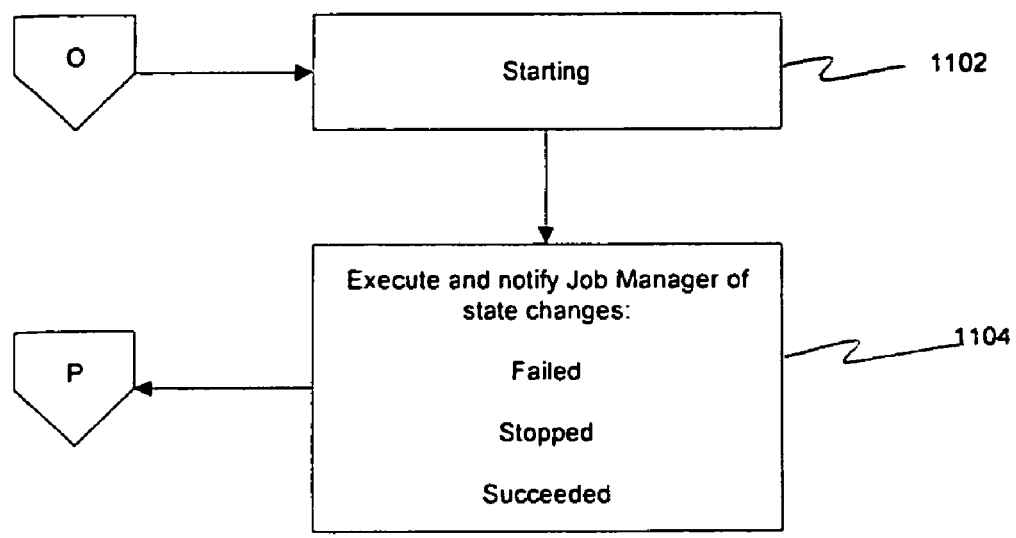
FIG. 11 illustrates steps in an example method according to an embodiment of the invention.

Using the environment and the library of Jobs, the developer is able to construct a Job Stream, which is represented by the flowchart of FIG. 3. The Job Stream itself is described by an XML file.

C. Starting a Job Stream

FIGS. 4 through 7 generally illustrate the steps to start a Job Stream.

At step 402, a file arrives, through ftp, e-mail or http, as previously described. At step 404, system 100 checks the entitlements of the file. If any of the entitlements fail, then at steps 406, 408, the failure is noted, system 100 sends a failure confirmation, and the process ends.

If the entitlement check at step 404 is successful, then at step 410, 412, the success is noted, system 100 sends a success confirmation, and the input file is temporarily renamed to a temporary name at step 414.

At step 502, system 100 places an entry for the temporarily renamed file into a queue, and marks the entry as inactive. The entry includes the real filename, the temporary filename as well as the defined filename. A timestamp is also recorded for the entry.

Once the file has entered the queue, it is up to the Stream Status Manager to run the Job Streams. The Stream Status Manager watches over the queue and executes any Streams that it deems runnable. To be runnable, the Stream Status Manager checks the following in steps 504, 506:

Check to see if the file is currently being processed. The file is running if another Stream for the same source+file combination is running.

Check to see if the file has any dependencies that still need to be resolved. Such dependencies would exist if the file were marked as being unsafe to run while other dependent streams/files were being processed.

After the steps above are completed and the file is deemed runnable, the Stream Status Manager marks the queue entry as being ready. It then fetches all entries in the queue that are marked inactive, ordered by their time of entry. Each inactive File is marked active and passed to Station for processing.

At step 602, the Station renames the File back to its original name, and at step 604, creates and starts a Job Manager to process the File. At step 702, the Job Manager will fetch the Job Stream definition and load the Job Stream. At step 606, the Station registers for events from the Job Manager, and at step 608, executes the Job Manager in a new thread.

At step 704, the Job Manager executes the kickoff Job, and then at steps 706, 708, manages the Jobs in the Job Stream until completion. Upon completion, at step 710, the Job Manager notifies the Station, which marks the Job Stream as complete at step 610. At step 508, the Stream Status Manager then removes the file from the queue.

The Job Manager's process is further described below with reference to FIGS. 8-11. Some of the same steps discussed above are repeated in the following description.

At step 802, the Station creates the Job Manager. At step 902, the Job Manager creates the new Job Stream. At step 1002, the Job Stream loads the XML Job Stream from the database. At step 1004, the Job Stream registers a default failure Job if it is defined in the Job Stream.

At steps 904, 906, the Job Manager notes that the Job Stream is loaded and ready to start processing, and loads the runtime variables. At step 804, the Station registers for Job Manager events, and at step 806, executes the Job Manager. At step 908, the Job Manager starts.

At step 1006, the Job Stream gets the Job definition, and if it is the first time, the kickoff Job. Otherwise it gets the success or failure Job.

At steps 910, 912, 914, the Job Manager creates the Job using the Job Factory, registers for Job events, and starts the Job thread and monitors Job events. At step 1102, the Job starts, and at step 1104, the Job executes and notifies the Job Manager of state changes. The state changes include: Failed, Stopped, and Succeeded.

At step 916, the Job Manager determines whether the state change was success or failure. If the state change was failure, then at step 1008, the Job Stream records the error and gets any dependent failure Jobs. If the state change was success, then at step 1010, the Job Stream records the success and gets any dependent success Jobs.

Following steps 1008 and step 1010, the Job Manager at step 918 determines whether there are additional Jobs to manage. If there are additional Jobs to manage, then at step 910, the Job Manager creates the Job using the Job Factory. If there are no additional Jobs to manage, then at step 920, the Job Manager determines whether all Jobs have succeeded, and sets the stream status at steps 922, 924, and 926.

At step 928, the Job Manager saves the Job Stream. At step 1012, the Job Stream saves the XML Job Stream to the database, and at step 930, the Job Manager stops.

At step 808, the Station removes the file from the queue. At step 810, the Station determines whether there are dependent files. If there are dependent files, then the Station loops again to step 802. If there are none, the process stops.

In the examples and descriptions above, a Job Stream is constructed from individual Jobs. It is also possible to create a Job Stream and save that Job Stream in the library with the Jobs. That saved Job Stream is then available for use in other Job Streams. A Job Stream that is saved in the library in this manner has a termination success and also a termination failure indication, much like the termination success and termination failure indication of a Job.

IV. Example Uses of Embodiments of the Invention

Some sample businesses and their uses for the various embodiments of the invention include: creating applications to process data used for web and printed material; creating applications for data validation and exception reporting for Hedge Fund systems; creating applications that convert mainframe reports to Excel and then send the Excel document by emails to clients; and reconciliation of transactions.

Applications developed within the environment of the invention may interact with Mainframe systems, FTP and Web Servers, as well as access and modify databases. Certain embodiments provide a robust and secure environment with centralized version control. A data feed may keep the user database current.

The environment of the invention is built in Java and is capable of running in any platform that supports the Java Runtime Environment—Windows, Unix, Linux, and Mainframe. The data that is processed in the environment can thus exist in one place and does not need to be duplicated and scattered on different servers throughout a firm. The environment also promotes the reuse of code and data.

V. Example Jobs

In general each Job in the library performs a processing function on an input file. Although a number of specific Jobs are described below, the examples are not all inclusive and other Jobs are clearly envisioned. Examples of some specific types of Jobs are:

A. Aggregator

Creates a distinct file based on specified keys. Similar to a "SELECT distinct <COLUMNS . . . >" in SQL where <COLUMNS> is the numeric positions of the columns you want to select. Commonly used to retrieve only unique values. Usually a predecessor Job to performing FunctionAggregator for sum totals, counts, minimum and maximums.

B. Approver

Puts Job Stream in a pending approval status. The clients that will approve this Job receive an email with a link to the Terminal. In the Terminal, the client views the file prior to approving or rejecting it. The developer specifies what action (Stream to run) should be taken for an approval or rejection. Commonly used to ask a user for approval before sending a file to a server or processing a file further.

C. Archiver

Archives files using PKZIP. Keeps specified number of iterations of the file backed up. See Restorer Job for retrieving entries from the archive. Commonly used to retain file backups.

D. BeeperContacter

Sends a page or beeps users in a specified group with a message. Commonly used to send failure notifications and cycle completion notifications.

E. Calculator

Creates new formula fields based on adding/subtracting/multiplying/dividing/exponentially applying constant operands to specified columns. Commonly used to convert decimal values into percent values (e.g., multiplying by 100).

F. CharReplacer

Replaces any single characters with specified single character. Use StringReplacer for replacement with the value null. Commonly used to replace a delimiter (pipe, comma, tilde, etc.) with another character, such as a tab character (\t). Can also be used to replace underscore with space, or replace a backslash with a tab in a date field to get month, day, and year into separate fields.

G. ColumnCalculator

Performs calculations between two columns in a file. The calculations are performed are generally the same calculations used in the Calculator Job. Instead of using a constant value, both the operand and the value are located in the columns. Commonly used to subtract the values in one column from another, or add the values in two columns together.

H. ColumnCombiner

Combines any number of specified columns to create a new column with the concatenated value. Commonly used to append month, day, and year to create a date field.

I. CompareX

Compares two files and generates a report of the differences. Similar to the diff function in UNIX and windiff function in Windows NT. Commonly used to compare expected results. For example, use the DatabaseSelector Job to retrieve data from Sybase and use the DatabaseSelector Job to retrieve data from DB2, then run the CompareX Job on the result.

J. Concatenator

Concatenates one or more files vertically. If File A has 6 columns with 10 rows and File B has 6 columns with 10 rows, the resulting file will have 6 columns and 20 rows. Commonly used to add the contents of 2 or more files to create one large file. Can also be used with just one file to copy the file to a different name.

K. Converter

Converts files from a fixed width to tab delimited format. The developer specifies the number of characters for each field. There is no need to provide positions. Converter will also unpack COBOL COMP-3 data types if requested as well as convert from EBCDIC to ASCII. Commonly used to convert mainframe file to Excel (TextToExcel follows). Also used to split individual column values (splitting a date into month, day, and year, based on positions).

L. DatabaseColumnSelector

Returns only one row, and one column based on the query provided. Useful for image and text data types. For other data types, use the DatabaseSelector Job. Commonly used to retrieve XML from a database, or save a binary image file out of the database into a file.

M. DatabaseDeleter

Removes records from a table based on specified filter criteria. This is a "DELETE" SQL Statement in which the "WHERE" clause is created based on columns specified and the values are retrieved from input file. Commonly used to remove all users that were in the environment on the previous day but are not in a list of authorized users today. For example to remove users who have left the firm.

N. DatabaseModifier

Performs inserts or updates of specified table and database using data file. If the record is not already in the table (using primary key fields), it is inserted. Otherwise the record is updated. Commonly used to update all user data with the newest information.

O. DatabaseSelector

Retrieves data from a database table and creates tab delimited text file. The SQL "SELECT" statement can be entered or derived based on input file and column names. Commonly used to retrieve all the users from the environment. For example, retrieve the email address of each user found in File ABC.

P. DatabaseStoredProcedure

Executes a stored procedure passing in the specified parameters and returns output parameters or a result set. Supports IN, OUT and INOUT parameters. Commonly used to execute Sybase stored procedures to insert and validate the customer's information.

Q. DuplicateChecker

Checks for duplicate records. Any duplicate records have their duplicate field replaced with a Null value. Commonly used to locate any mutual funds with duplicate symbols, and replace them with null.

R. EmailContacter

Sends Email in either HTML or Text format (attachments are allowed). Recipients are either specified using a group name or address file. The address file usually contains either an email address or a user ID. Commonly used to send email to clients with a final report as an attachment or as an embedded HTML file. Also used to send email failure notifications to systems team. Also used to send email to the clients with records they sent to the environment that did not pass validation.

S. ExcelConverter

Converts Excel format files to tab delimited files. Commonly used to send the contents of an Excel file to the mainframe in fixed format. See the Unconvertor Job, which may be used following the ExcelConvertor Job.

T. Extracter

Extracts specified columns from file in order specified. Commonly used to rearrange columns in file, or retrieve only a few columns from a file.

U. FileAppender

Appends one or more files to the specified output file. Different from Concatenator in that the files can have a different number of columns. Also, and FileAppender creates a new file only if it does not already exist. Commonly used every time an email arrives from the client, to record that action in a history file. In a loop, it will add the filtered results to a main file. Use FileCreator to initialize the file before entering the loop.

V. FileCleaner

Deletes a specified output file. This output file can be a wildcard using the "*" character. Commonly used to remove all files in a directory for a source.

W. FileCreator

Creates a new file based on data and specified number of columns. Commonly used to create a variable name-value file with 2 columns to be used by a VariableLoader Job. Can be used to initialize a file to 0 bytes by passing in 0 column value.

X. FileSearcher

Retrieves all the records from file A that are found in file B based on the specified keys. The keys can be in different positions for both the files. Similar to a join in SQL. Commonly used to get all the users (File A) that completed their assigned tasks (File B) and update the database (DatabaseModifier) accordingly.

Y. FileZipper

Using a compression algorithm, such as the PKZip compression algorithm, creates a new Zip archive adding the specified files. Commonly used to compress several large files before emailing them as an attachment.

Z. Filler

Inserts the specified value (including null) at the column(s) listed. Commonly used to add today's date to a file using filler value % TODAY %.

AA. Filterer

Retrieves records based on condition specified. Either "AND" or "OR" can be used across criteria specified. Using the inverse file name, you can split the file into two output files using filter criteria. Similar to a SELECT . . . WHERE in SQL, but more advanced. Commonly used to get all the records that have a null in a position. Can be used to split the file into two, those that have a numeric value in one position and those that do not. Can also send the non-numeric values back to the user (EmailContacter), or get all records that have a character, such as "E" in a position.

BB. FiltererColumn

Retrieves records based on comparison of two specified columns. Similar to the Filterer Job except the compare is done across two columns instead of using a constant value. Commonly used to get all records where one column is equal to another column.

CC. Formatter

Formats columns with one or more format styles. Some available formats include:

ZeroFormatter—fill with zeros;
DateFormatter—format to and from any date: mm/dd/yyyy, yyyymmdd, m/dd/yy, mm/dd/yy, yymmdd, or mmddyyyy;
NullFormatter—replace nulls with value;
SignFormatter—reverse signs;
DecimalFormatter—round decimals;
Upper/Lower/Title Case Formatter; and
ZonedFormatter—Convert to/from zoned. These different formats are commonly used to replace a null value with an "N/A" or format the current market value field to two decimal places, or change the date format from mm/dd/yyyy to yyyymmdd.

DD. FTPRetriever

Retrieves files from an ftp host in either ASCII or binary transmission modes and passive or active transfer modes. Performs the ftp "GET" command. Commonly used to get files from a given host for subsequent processing in a Job Stream.

EE. FTPSender

Sends files to a specified FTP host in either ASCII or binary transmission modes. Performs the ftp "PUT" command. Commonly used to send files to a given host after the environment has completed modifications to the file.

FF. FunctionAggregator

Performs an aggregation function (sum, min, max, count, etc) on a specified file. Aggregation is done with a file containing distinct column values, a file with non-distinct values, and the function specified. Commonly used to determine the number of times a value has appeared in the specified column in a file, using the function "count".

GG. JudgeAndJury

Performs file overlay using multiple files specified in order of priority. If data for a column is missing from one file, it is taken from the file with next priority. Commonly used to put together data from various records of the same file layout.

HH. JudgeAndJuryAdvanced

Performs JudgeAndJury and also creates a secondary file reflecting which file for a specific column took precedence in each column. Commonly used to show which columns in File B were overlaid from File A when JudegeAndJury is performed on File A that comes from Source 1 and File B that comes from Source 2.

II. JudgeAndJuryRow

Performs file overlay using multiple files specified in order of priority. Rows will be merged based on keys using the priority record. Commonly used to override previous data with new priority data retaining row integrity.

JJ. KeyChanger

Replaces keys with values from a lookup file or inserts the keys next to the values in a new column. Commonly used to translate words to a different language by looking up words in a "dictionary" file.

KK. KeyLoader

Loads text file with two columns into the environment as a key value pair. The keys loaded are tied to a source for distinction from previous loaded keys.

LL. LengthChecker

Determines if specific columns exceed a specified number of characters. One input file is checked; it contains the column(s) to be verified. If a column value exceeds the number of specified number of characters, the corresponding row will be written to the output file. An output file with 0 bytes means the Length Checker found no columns that exceeded the specified number of characters. This Job fails when a column exceeds the specified length of characters. It will also fail with an empty file. Commonly used to check for an empty file by testing the first column for a length greater than zero.

MM. LineNumberer

Puts incremental numbers in a specified column position and specified increment value. Commonly used to number the lines in a file and also determine the total number of lines in a file.

NN. LineRemover

Removes any number of header or footer lines from a file. Output written to a file can be lines removed or lines not removed. Commonly used with concatentor to decrement a list of values and overwrite the original list with the sub list.

OO. MainframeStarter

Using JES Reader, submits Mainframe JCL. Commonly used to start a Job on the mainframe, trigger a mainframe Job to FTP to the environment and retrieve a file.

PP. Merger

Joins two files using either a one-to-one or one-to-many matching condition. Files are merged horizontally based on keys found in the first file. Commonly used to add values to each row of file based on a specific key.

QQ. NotInFileSearcher

Checks to see if specified columns of the input file do not have matching values in a look up file. Values that do not match are written to an output file. Commonly used to check for data that is not contained in a file to see what needs to be added.

RR. NullJob

Do Nothing. Used as a place holder or a Goto Job return point. Commonly used as a Kick off Job. This Job allows the creation of a new parent for any Job that is its child. Also used as a separation of logical groupings of Jobs with comments about each group.

SS. Promoter

Moves a file to another directory. A file can be moved to different directories in the environment. Commonly used when the developer is done manipulating a file and want to place it in a more permanent directory. It is good practice to put a Job Stream's output files in one permanent directory (e.g., the silver directory) and the final output as result of all streams into another permanent directory (e.g., the gold directory).

TT. QuickSorter

Sorts a file by requested columns in Ascending or Descending order. The output file is sorted from the first column in the list. All columns thereafter are sorted based on matching criteria from the previous column. Ascending order is default. Sorted output is written to a new file. Commonly used to quickly sort large files.

UU. Reconciler

Compares two files, such as debits/credits, based on specified keys and comparison condition. Tolerance can be entered to allow for more flexible matching. Three files are created for output, unmatched debits, unmatched credits, and matched results. Commonly used to verify if a separate process correctly processed a file.

VV. Restorer

Restores files that have been archived (zipped).

WW. Rotator

Interchanges the rows of a tab-delimited input file with the columns. All rows become columns, and all columns become rows. Commonly used to swap columns with rows. Also used for turning a column into a row of headers.

XX. Sorter

Sorts a file in Ascending or Descending order corresponding to the designated columns. Each Column is sorted in the stated order. Subsequent columns are sorted based on matching criteria from the previous column. Commonly used for sorting of smaller files. For large files, see the QuickSorter Job.

YY. SpaceRemover

Removes spaces from the beginning and ending of the tab-delimited columns of the input file, spaces within the columns themselves remain. Similar to trimming a string. Commonly used to clean up files or after conversions. Some Jobs leave new-line characters, and or spaces after columns.

ZZ. StreamStarter

Starts another Job Stream in any source. Commonly used to create a black box effect where common Job Stream functionality can be processed prior to calling another stream.

AAA. StringReplacer

Replace any string (text grouping) in a file with another string. Leaving the replacement string empty will result in a replacement of a null value (nothing). Commonly used to replace a string with another. Also used to replace a variable, loaded with variable loader in a looped stream. Also used to remove text throughout a file.

BBB. TextToExcel

Converts tab delimited files to Excel files. Commonly used to convert data from text format to an Excel format.

CCC. TextToExcelTemplate

Converts tab delimited files to Excel files with a template. Template file contains formatted cells (colors, currency, etc), which are used in the newly created Excel file. Commonly used to retain the headers and formatting of an Excel file and incorporate the data beneath the headers.

DDD. TextToXML

Convert a tab-delimited file into XML format. The Job takes in three inputs. The file description string, a header file in which each column represents a node for the xml file, and a file containing data to assign to each corresponding node. Commonly used to prepare XML for an XSLT transformer conversion to HTML.

EEE. TimeFrameChecker

Checks time frame (within month end, quarter end, year end). Commonly used to check the current time to decide whether a stream should continue.

FFF. UnConverter

Converts tab delimited file into a fixed width file, using specified width per column. Each column can be aligned to the left or right. Commonly used to convert a tab delimited file into a file ready for mainframe processing.

GGG. Validator

Validates data (Double, String, Date, Float, Integer) for specified columns in an input file. Commonly used to ensure that market values are valid numbers.

HHH. VariableLoader

Loads runtime name-value pairs from a file into memory to be used by subsequent Jobs within the same stream. Given a two column input file with variable name (column1)–value (column2) pairs, this Job loads the values (column2) into the variables (column1) to memory for subsequent Jobs to use in the same stream. Variable may be referenced later using %VARIABLE_NAME%. Commonly used for dynamic values that need to be interpreted in subsequent Jobs.

III. WebDownloader

Given a URL to a document, this Job downloads the document to the environment using the HTTP protocol. Commonly used to download a web page to include as content in an email.

JJJ. XMLTransformer

Transform XML data to another format using roles in an XSL file. XSL file must exist in the environment prior to running this Job. Commonly used to transform a file from XML format to HTML with XSL. Also used to transform an XML file to XSL-FO, and then convert to PDF using XML Formatter.

KKK. XMLFormatter

Converts input XSL-FO file to a specific output format and writes the output to a file. Commonly used to make PDF files.

Although illustrative embodiments have been described herein in detail, it should be noted and will be appreciated by those skilled in the art that numerous variations may be made within the scope of this invention without departing from the principles of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method implemented at least partially in a programmed computer for software application development suitable for processing input files with varying file formats or data structures, the method comprising:
   characterizing the file format and data structure of at least one known input file type using the programmed computer; and
   creating a library comprising a plurality of jobs to perform predetermined functions using the programmed computer, wherein the library of jobs comprises at least one job to read the file format and data structure of the known input file and convert that input file to a tab delimited file format or data structure that is common to the plurality of jobs, at least one job for extracting data from a file, at least one job for archiving files, at least one job for loading files, at least one job for messaging, at least one job for transforming data in a file, at least one job for validating data in a file, and further wherein each job includes an indicator of job termination success or job termination failure, and the plurality of jobs can be linked according to the indicator of job termination success or job termination failure.

2. A method according to claim 1, further comprising:
   creating a job stream library using the programmed computer, the job stream library comprising at least one job stream, the job stream comprising individual jobs from the library of jobs, and the at least one job stream in the job stream library including an indicator of job stream termination, wherein the indicator is either job stream termination success or job stream termination failure.

3. A method according to claim 1, further comprising adding jobs to the library of jobs using the programmed computer.

4. A system implemented at least partially in a programmed computer for software application development suitable for processing input files with varying file formats or data structures, the system comprising a processor with:
   computer program means for characterizing the file format and data structure of at least one known input file type; and
   computer program means for creating a library comprising a plurality of jobs to perform predetermined functions, wherein the library of jobs comprises at least one job to read the file format and data structure of the known input file and convert that input file to a tab delimited file format or data structure that is common to the plurality of jobs, at least one job for extracting data from a file, at least one job for archiving files, at least one job for loading files, at least one job for messaging, at least one job for transforming data in a file, at least one job for validating data in a file, and further wherein each job includes an indicator of job termination success or job termination failure, and the plurality of jobs can be linked according to the indicator of job termination success or job termination failure.

5. A computer-executable program that is tangibly embodied on a computer-readable medium as computer executable software code, the code for software application development suitable for processing input files with varying file formats or data structures, the code comprising:
   code to characterize the file format and data structure of at least one known input file type; and
   code to create a library comprising a plurality of jobs to perform predetermined functions, wherein the library of jobs comprises at least one job to read the file format and data structure of the known input file and convert that input file to a tab delimited file format or data structure that is common to the plurality of jobs, at least one job for extracting data from a file, at least one job for archiving files, at least one job for loading files, at least one job for messaging, at least one job for transforming data in a file, at least one job for validating data in a file, and further wherein each job includes an indicator of job termination success or job termination failure, and the plurality of jobs can be linked according to the indicator of job termination success or job termination failure.

6. A programmed computer for software application development suitable for processing input files with varying file formats or data structures, comprising:
   a memory having at least one region for storing computer executable program code; and
   a processor for executing the program code stored in the memory, wherein the program code comprises:
   code to characterize the file format and data structure of at least one known input file type; and
   code to create a library comprising a plurality of jobs to perform predetermined functions, wherein the library of jobs comprises at least one job to read the file format and data structure of the known input file and convert that input file to a tab delimited file format or data structure that is common to the plurality of jobs, at least one job for extracting data from a file, at least one job for archiving files, at least one job for loading files, at least one job for messaging, at least one job for transforming data in a file, at least one job for validating data in a file, and further wherein each job includes an indicator of job termination success or job termination failure, and the plurality of jobs can be linked according to the indicator of job termination success or job termination failure.

7. A system implemented at least partially in a programmed computer for software application development, comprising a processor with:

computer program means for selecting a plurality of jobs from a preexisting library of jobs, wherein the library of jobs comprises at least one job to read the file format and data structure of the known input file and convert that input file to a tab delimited file format or data structure that is common to the plurality of jobs, at least one job for extracting data from a file, at least one job for archiving files, at least one job for loading files, at least one job for messaging, at least one job for transforming data in a file, at least one job for validating data in a file, and further wherein each job includes an indicator of job termination success or job termination failure;

computer program means for creating a job stream, the job stream comprising the plurality of jobs linked to each other according to the indicator of job termination success or job termination failure;

computer program means for creating a manager;

computer program means for receiving the data file; and computer program means for processing the data file with the job stream in a plurality of steps, either in sequence or in parallel, using the manager, wherein at least one of the plurality of steps comprises converting the file format and data structure of the data file to the tab delimited file format or data structure common to the plurality of jobs.

8. A computer-executable program that is tangibly embodied on a computer-readable medium as computer executable software code, the code for software application development, the code comprising:

code to select a plurality of jobs from a preexisting library of jobs, wherein the library of jobs comprises at least one job to read the file format and data structure of the known input file and convert that input file to a tab delimited file format or data structure that is common to the plurality of jobs, at least one job for extracting data from a file, at least one job for archiving files, at least one job for loading files, at least one job for messaging, at least one job for transforming data in a file, at least one job for validating data in a file, and further wherein each job includes an indicator of job termination success or job termination failure;

code to create a job stream, the job stream comprising the plurality of jobs linked to each other according to the indicator of job termination success or job termination failure;

code to create a manager;

code to receive the data file; and code to process the data file with the job stream in a plurality of steps, either in sequence or in parallel, using the manager, wherein at least one of the plurality of steps comprises converting the file format and data structure of the data file to the tab delimited file format or data structure common to the plurality of jobs.

9. A programmed computer for software application development, comprising:

a memory having at least one region for storing computer executable program code; and a processor for executing the program code stored in the memory, wherein the program code comprises:

code to select a plurality of jobs from a preexisting library of jobs, wherein the library of jobs comprises at least one job to read the file format and data structure of the known input file and convert that input file to a tab delimited file format or data structure that is common to the plurality of jobs, at least one job for extracting data from a file, at least one job for archiving files, at least one job for loading files, at least one job for messaging, at least one job for transforming data in a file, at least one job for validating data in a file, and further wherein each job includes an indicator of job termination success or job termination failure;

code to create a job stream, the job stream comprising the plurality of jobs linked to each other according to the indicator of job termination success or job termination failure;

code to create a manager;

code to receive the data file; and code to process the data file with the job stream in a plurality of steps, either in sequence or in parallel, using the manager, wherein at least one of the plurality of steps comprises converting the file format and data structure of the data file to the tab delimited file format or data structure common to the plurality of jobs.

* * * * *